United States Patent

[11] 3,629,084

| [72] | Inventor | Anthony C. Soldatos<br>Kendall Park, N.J. |
|---|---|---|
| [21] | Appl. No. | 834,910 |
| [22] | Filed | June 19, 1969 |
| [45] | Patented | Dec. 21, 1971 |
| [73] | Assignee | Union Carbide Corporation<br>New York, N.Y.<br>Continuation-in-part of application Ser. No. 718,225, Apr. 2, 1968. This application June 19, 1969, Ser. No. 834,910 |

[54] METHOD OF IMPROVING THE TACK OF RUBBERS
8 Claims, No Drawings

| [52] | U.S. Cl. | 204/168 |
|---|---|---|
| [51] | Int. Cl. | B01k 1/00 |
| [50] | Field of Search | 204/165, 168 |

[56] References Cited
UNITED STATES PATENTS

| 3,256,368 | 6/1966 | Soldatos et al. | 260/848 |
|---|---|---|---|
| 3,274,090 | 9/1966 | Amborski | 204/165 |
| 3,294,866 | 12/1966 | Soldatos | 260/845 |
| 3,376,208 | 4/1968 | Wood | 204/168 |
| 3,387,991 | 6/1968 | Erchak | 204/168 X |

*Primary Examiner*—F. C. Edmundson
*Attorneys*—Paul A. Rose, Aldo J. Cozzi and James C. Arvantes ABSTRACT: This invention relates to a method of improving the tack of rubbers, such as ethylene-propylene polymers, in a relatively short period of time by adding thereto a tackifier and subjecting the resultant compositions to an electric discharge.

METHOD OF IMPROVING THE TACK OF RUBBERS

This application is a continuation-in-part of my copending application Serial No. 718,225 filed Apr. 2, 1968.

This invention relates to a method of improving the tack of rubbers. More particularly, this invention relates to a method of improving the tack of synthetic rubbers, such as ethylene-propylene polymers, in a very short period of time, in some instances on the order of seconds by adding thereto tackifier and thereafter subjecting the resultant compositions to an electric discharge.

It has been found that the tack of synthetic rubbers such as ethylene-propylene polymers can be significantly improved by the addition to these polymers of polymeric phenolic tackifiers, as for example, phenol-formaldehyde resins and phenolated polymers of isoprene. Development of a significant degree of tack in such compositions, however, requires that these compositions be aged for a period of hours as a rule under controlled conditions of temperature and humidity. As an illustration, a composition containing 5 percent by weight of a polymer of isoprene phenolated with p-dodecylphenol (identified subsequently in this application as Polymer B), based on the weight of an ethylene-propylene polymer, generally requires an ageing period of about 96 hours, at a temperature of 75° F., while under a relative humidity of 12 percent, in order to achieve a degree of tack wherein strips produced therefrom and subjected to the Test for Tack (described in detail subsequently in this application) are nonseparable.

The resent invention provides for significantly improving the tack of rubbers, to which have been added a tackifier, in some instances in a matter of seconds and without any special regard for conditions of temperature and relative humidity.

According to the present invention, the tack of rubbers is significantly improved, in a shirt period of time, by adding thereto a tackifier and subjecting the resultant compositions to an electric discharge.

As will be appreciated from the following discussion and examples, a wide variety of rubbers, both natural and synthetic can be treated in accordance with the present invention to improve the tack thereof. Illustrative of such rubbers are the natural rubbers; balata, caoutchouc, caucho gutta percha, gutta-siak, juleting, kickxia, manihot, latex from the Hevea brasiliensis; synthetic diene polymers, such as homopolymers of hydrocarbons containing two unsaturated bonds such as butadiene-1,3, 2,3-dimethylbutadiene-1,3 and the like, or copolymers of these with one or more copolymerizable monoolefinic compounds. Copolymerizable monoolefinic compounds are organic compounds which contain a single olefinic double bond:

and which are copolymerizable with butadiene-1,3 hydrocarbons. Such compounds are usually low-molecular weight compounds of less than 10 carbon atoms which contain at least two hydrogen atoms and at least one radical other than hydrogen attached to the unsaturated double bond carbon atoms, as in the structure:

where at least one of the disconnected valences is attached to a group other than hydrogen, such as, chlorine, alkyl, alkoxy, acyl, cyano, or aryl.

Examples of such compounds include styrene, p-methylstyrene, alpha-methylstyrene, p-chlorostyrene, vinyl naphthalene and similar aryl olefins and substituted aryl olefins; isobutylene and similar copolymerizable olefinic hydrocarbons; acrylic and substituted acrylic acids and their esters, nitriles and amides such as acrylic acid, acrylonitrile, methacrylonitrile, alpha-chloroacrylonitrile, methylacrylate, methylmethacrylate, ethylmethacrylate, methyl alpha-chloroacrylate, acrylamide, methacrylamide and the like; vinyl methyl ketone, vinyl methyl ether, vinylidene chloride, N-vinyl carbazole, N-vinyl pyrrolidone and similar copolymerizable compounds containing a single olefinic double bond. Other suitable rubbers are the chlorohydrin rubbers, the allylglycidyl ether-propylene oxide rubbers and the like.

Particularly desirable rubbers, for purposes of this invention are the ethylene-propylene polymers which can be cured to elastomeric products.

Among such suitable polymers are the copolymers and interpolymers containing at least about 20 percent by weight combined ethylene, preferably about 20 to about 80 percent by weight combined ethylene and at least about 20 percent by weight combined propylene.

As previously stated, among particularly desirable rubbers are copolymers of ethylene-propylene and interpolymers of ethylene-propylene and a polymerizable monomer having at least one olefinic double bond wherein, in each case, the combined ethylene and combined propylene are as defined above.

Illustrative of suitable mono-olefinic compounds are those having the formula:

Formula I

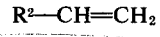

wherein $R^2$ is a monovalent hydrocarbon radical generally containing a maximum of 10 carbon atoms and preferably containing a maximum of 8 carbon atoms. Among such monovalent hydrocarbon radicals are the alkyl radicals such as ethyl, propyl, hexyl, 2-ethylhexyl and the like; aromatic radicals such as phenyl, naphthyl and the like; cycloalipatic radicals such as cyclohexyl, n-propylcyclohexyl and the like.

Methods for preparing copolymers of ethylene-propylene and interpolymers of ethylene-propylene and a monoolefinic compound are described in detail in U.S. Pat. Nos. 3,000,867 to B. S. Fisher and 2,975,159 to V. Weinmayr, respectively.

Suitable diene monomers which can be used to produce interpolymers and methods for polymerizing these diene monomers with ethylene and propylene are described in U.S. Pat. No. 3,000,866 to R. E. Tarney and 3,211,709 to S. Adamek et. al. respectively.

Especially desirable diene monomers are hexadiene-1,4,dicyclopentadiene, ethylidenebicycloheptane and the like.

Illustrative of tackifiers which are added to rubbers are the polymers of isoprene, which are used per se or which are phenolated with suitable phenols. Among such polymers of isoprene are homopolymers of isoprene, copolymers of isoprene and phenolated polymers thereof as will be subsequently described, which generally have a number average molecular weight of about 500 to about 30,000.

Illustrative of polymers of isoprene which are phenolated and are the preferred tackifiers of this invention, are homopolymers of isoprene which generally have a number average molecular weight of about 500 to about 30,000, preferably a number average molecular weight of about 500 to about 10,000 and more preferably have a number average molecular weight of about 1,000 to about 8,000; and which contain less than about 50 percent by weight and preferably less than about 20 percent by weight internal unsaturation (based on the weight of the total unsaturation).

Number average molecular weight was determined by Vapor Phase Osmometry.

Total unsaturation was determined by Wijs method (modified by correcting for substitution reactions).

Internal unsaturation was determined by Nuclear Magnetic Resonance and Infrared Analysis.

Internal unsaturation as used herein refers to unsaturated units which makeup the backbone of the polymers as opposed to pendant unsaturated units.

For instance, internal unsaturation with respect to polyisoprene refers to the percent by weight of the diene units of isoprene (2-methyl butadiene-1,3) which have combined at the 1,4 position as opposed to the 1,2 and 3,4 positions.

1,4-position 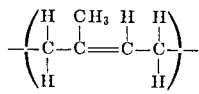

1,2-position 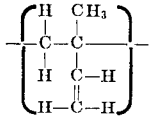

3,4-position 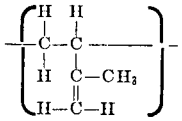

It is to be understood that homopolymers of isoprene, as used herein, are intended to include halogenated, hydrogenated and other like homopolymers of isoprene.

Preparation of polymers of isoprene, particularly homopolymers of isoprene, having the number average molecular weight and/or the unsaturation previously described can be conducted as described in this application and also as described in the following articles.

QUARTERLY REVIEW, Vol. 16, page 361—1962
"Stereo Regular Addition Polymerization"
C. F. H. Bawan and A. Ledwith
JOURNAL OF POLYMER SCIENCE, Vol. 3, pages 2,223–28 1965
"Solvent Effects in Anionic Copolymerization Reactivity of Dienes"
K. F. O'Driscoll
JOURNAL OF POLYMER SCIENCE, Vol. 27—1957
"Polymerization of Isoprene with Lithium Dispersions and Lithium Alkyls using Tetrahydrofuran as Solvent"
Henry Hsieh, D. J. Kelly, A. V. Tobolsky
JOURNAL OF POLYMER SCIENCE, Vol. 40, pages 73–89 1959
"Isoprene Polymerization by Organometallic Compounds"
A.V. Tobolsky, C. E. Rogers Among other suitable polymers of isoprene are those obtained by polymerizing isoprene with one or more of a compound having at least one olefinic double bond to obtain a copolymer or interpolymer containing at least about 30 percent by weight combined isoprene. Exemplary of suitable monomers having at least one olefinic double bond are described subsequently in this application. These polymers can be hydrogenated, halogenated and the like as previously described.

Among suitable phenols which can be used to phenolate the polymers of isoprene are those compounds which have the formula:

Formula II

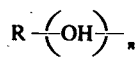

wherein R is an aromatic hydrocarbon radical generally containing a maximum of 31 carbon atoms and preferably containing a maximum of 21 carbon atoms and n is an integer having a value of 1 to 3 inclusive.

Especially desirable phenols are those having the formula:

Formula III

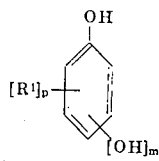

wherein each $R^1$, which can be the same or different, is an alkyl radical generally containing a maximum of 25 carbon atoms and preferably containing a maximum of 15 carbon atoms, an alkoxy radical generally containing a maximum of 25 carbon atoms, a cycloaliphatic radical generally containing a maximum of 25 carbon atoms and preferably containing a maximum of 12 atoms, nitro, sulfone, sulfur, or halogen, i.e., chlorine, bromine, fluorine, or iodine; $p$ is an integer having a value of 0 to 5 inclusive, $m$ a value of 0 to 3 inclusive and the maximum sum of $p+m=5$.

Illustrative of suitable phenols are the following: phenol, nitrophenol, thiophenol, alkylated phenols such as m-cresol, o-ethylphenol, m-ethylphenol, p-isopropylphenol, p-tertbutylphenol, o-amylphenol, p-hexylphenol, p-nonylphenol, p-octylphenol, o-nonylphenol, p-dodecylphenol, o-dodecylphenol, 2,6-di-nonylphenol, 2,4-diethylphenol, 2,4-di-hexylphenol, 2,4-dinonylphenol, 2,4-didodecylphenol, 2,3,5-triethylphenol, 2,3,5-trihexylphenol, 2,3,5-triheptylphenol, 2,3,4,5-tetrahexylphenol and other like phenols, as well as the commercially available metacresol which contains small amounts of both the para and the ortho isomers; alkoxylated phenols, exemplary of which are m-methoxyphenol, o-methoxyphenol, p-methoxyphenol, m-hexoxyphenol, o-hexoxyphenol, p-hexoxyphenol, 2,4-dimethoxyphenol 2,4-dihexoxyphenol, 2,3,5-tri-methoxyphenol, 2,3,5-trihexoxyphenol, 2,3,4,5-tetrahexoxyphenol and the like; halogenated phenols such as ortho, meta or parabromo phenol, 2,4-dichlorophenol, 2,3,5-trichlorophenol, 3-chloro-4-methylphenol, 4-bromo-6-ethoxyphenol and the like; styryl phenol, cymyl phenol, α-methyl styryl phenol and the like; polyhydric phenols such as pyrocatechol, hydroquinone, resorcinol and the like; alkylated dihydroxy phenols such as 1,3-dihydroxy-4-methylbenzene, 1,2-dihydroxy-4-hexylbenzene and the like; alkoxylated dihydroxy phenols such as 1,4-dihydroxy-3-hexoxybenzene and the like; cycloaliphatic phenols such as p-cyclopentylphenol p-cyclohexylphenol and the like; halogenated dihydroxy phenols such as 1,2-dihydroxy-4-chlorobenzene and the like; trihydricphenols such as phloroglucinol, pyrogallol and the like; polynuclear phenols such as 2,2-bis(p-hydroxyphenyl)propane and the like.

As a general rule, the phenolated polymers of isoprene contain about 5 to about 75 percent by weight and preferably about 10 to about 40 percent by weight combined phenol based on the total weight of the polymer.

Phenolated polymers of isoprene can be prepared as described in this application and also as described in U.S. Pat. No. 3,177,166, issued Apr. 6, 1965, to J. T. Gregory et al.

Other suitable phenolic tackifiers are the phenolformaldehyde resins which are generally produced by reacting an alkylated phenol with formaldehyde in the presence of an acid or alkaline catalyst, as for example oxalic acid and sodium hydroxide. Suitable phenols are the alkylated phenols of formula III wherein $R^1$ preferably contains 9 to 25 carbon atoms inclusive. These phenolic tackifiers are further described in U.S. Pat. No. 3,294,866. Other suitable tackifiers are the terpene resin tackifiers, the coumarone-indene copolymer resins and the like.

In carrying out the present invention, the tackifiers are added to the rubbers in amounts sufficient to increase the tack thereof. As a rule, this amount is at least about 1 percent by weight tackifier and generally about 8 to about 100 percent by weight—based on the weight of rubber.

Particularly effective results are achieved using from about 5 to about 20 percent by weight tackifier based on the weight of the rubber.

It is to be understood that mixtures of tackifiers and/or mixtures of rubbers can be used if so desired. The addition of one to the other can be carried out on a two-roll mill, in a Banbury mixer or a twin screw extruder.

Once the compositions are formulated, they are generally formed into sheet form, as for example, on a two-roll mill and subjected to an electric discharge. The treatment, as described, can be conducted under atmospheric, subatmospheric, or superatmospheric pressure, generally on the order of about 1 mm. of Hg. pressure to about 3 atmospheres pressure. Atmospheric pressure is preferred.

As examples of "electric discharge" can be noted corona discharge, glow discharge (corona discharge developed in a partial vacuum) and the like.

Subjecting the rubber compositions to an electrical discharge can be carried out in a manner as is well known by those skilled in the art. More specifically, in subjecting the rubber compositions to a corona discharge, it is preferred to operate under the following conditions:

| | |
|---|---|
| Electrodes | flat electrodes, screen electrodes, multiple bar electrodes |
| Space Between Electrodes and Article Being Treated | about 1/16 to about ¼ of an inch |
| Output Voltage | about 5,000 to about 30,000 volts |
| Current | alternating or direct (when operating with direct current, alternating multiple electrodes are used) |

As a general rule, in order to effect a dispersion of the corona discharge and to avoid "channeling" when the composition being treated contains an electrically conductive material such as carbon black, a dielectric such as glass or mica filled glass is interposed between the article being treated and the electrodes, either as a coating on the electrodes or as a separate interface.

In a preferred embodiment, the electrodes used are screen electrodes and the operating conditions are such that the article being treated is subjected to about 250 volt ampere seconds per square inch.

The period of time to which each composition is treated, as described, will depend upon the concentration of the tackifier, the exact formulation of the compositions as well as the conditions, as set forth above, being utilized.

To the compositions, treated according to this invention, can be added pigments, fillers, lubricants, plasticizers, curing agents, accelerators, stabilizers, antioxidants, and the like as is well known in the art. Specific additives are pigments such as carbon black and clay; lubricants such as stearic acid and plasticizers such as naphthenic oils.

In those instances wherein the compositions of this invention contain a rubber which is devoid of olefinic unsaturation, for example, a copolymer of ethylene and propylene, or an interpolymer of ethylene-propylene and a monoolefinic compound, the compositions can be cured to elastomeric products using an organic peroxide such as dicumyl peroxide. In those instances wherein rubber contains olefinic unsaturation such as an interpolymer of ethylene-propylene and hexadiene-1,4, the compositions can be cured to elastomeric products using sulfur.

The amount of curing agent, the length of the curing cycle and the temperature thereof will depend, in each instance, upon the exact formulation of the compositions, as for example, is described in U.S. Pat. No. 3,200,174 and also as described in this application.

It is to be understood that the disclosure or all patents and literature references are incorporated herein by reference, as is the disclosure of applicant's copending parent application.

In order to demonstrate the excellent "tack" effected by the method of this invention, various compositions were formulated, formed into strips—1 inch by 6 inches by one-eighth of an inch, and treated with an electric discharge as described.

The Test for Tack was carried out by pressing two such strips together using a 2-pound roller and then manually pulling the strips apart. "Tack" was judged on the basis of the difficulty encountered in attempting to manually separate the strips.

The various polymers used in formulating the compositions were prepared as follows:

PREPARATION OF POLYMER A—POLYISOPRENE

Into a 2-liter flask equipped with a stirrer, reflux condenser and dropping funnel, there was distilled 1,000 ml. of tetrahydrofuran which had been dried using lithium aluminum hydride. During this distillation the system was continuously purged with nitrogen gas. To the distilled tetrahydrofuran there was first added 0.130 mole of butyl lithium in 80 ml. of n-heptane and then 122 grams of isoprene in 6.8 gramportions over a period of 1 hour. During the addition of the isoprene, the temperature of the reaction mixture was maintained at 50°–55° C. After the addition of the isoprene, the reaction mixture was maintained at a temperature of 60° C. for 2 hours while being constantly stirred. Methanol was added to the mixture and the product polyisoprene was recovered as the methanol insoluble portion of the mixture. The polyisoprene was stabilized by adding thereto 0.05 gram of 2,6-di-t-butyl-4-methylphenol and then dried by being placed in a vacuum oven for 18 hours. The vacuum oven was at a temperature of 40° C. and was operating under a pressure of 5 mm. of Hg.

Analysis:

| | |
|---|---|
| Number average molecular weight | = 2,000 |
| Percent internal unsaturation | = 5 |
| Yield | = 116 grams of a viscous liquid |

PREPARATION OF POLYMER B—PHENOLATED POLYISOPRENE

Into a 2-liter flask, equipped with a stirrer and reflux condenser, there was charged 602 grams of p-dodecylphenol and 40 grams of polyisoprene (Polymer A). To this mixture there was then added 10.4 grams of P-toluene sulfonic acid and the reaction mixture heated to a temperature of about 80° C. and maintained at this temperature for 7 hours while under a nitrogen gas atmosphere. After this 7 hour period, the reaction mixture was allowed to stand for 24 hours at a temperature of about 30° C. The phenolated polyisoprene was recovered as described with respect to Polymer A.

Analysis:

| | |
|---|---|
| Number average molecular weight | = 2,700 |
| Melting point | = 87°–92° C. |
| Percent by weight combined p-dodecylphenol | = 23 based on the total weight of the isoprene polymer |
| Percent internal unsaturation | = 5 |

PREPARATION OF POLYMER C—PHENOLATED POLYISOPRENE

Into a 2-liter flask, equipped with a stirrer and reflux condenser, there was charged 520 grams of p-nonylphenol and 40 grams of polyisoprene (Polymer A). To this mixture there was then added 10.4 grams of p-toluene sulfonic acid and the reaction then carried out in a manner described for Polymer B.

Analysis:

| | |
|---|---|
| Number average molecular weight | = 2,600 |
| Melting point | = 92°–98° C. |
| Percent by weight combined p-nonylphenol | = 20 based on the total weight of the isoprene polymer |
| Percent internal unsaturation | = 5 |

PREPARATION OF POLYMER D—PHENOLATED POLYISOPRENE

Into a 2-liter flask equipped with a stirrer and reflux condenser, there was charged 450 grams of phenol and 55 grams of polyisoprene (Polymer A). To this mixture there was then added 14.3 grams of p-toluene sulfonic acid and the reaction mixture was heated to a temperature of 100° C. and maintained at this temperature for 1 hour while under a nitrogen gas atmosphere. The reacted mixture was distilled to a pot temperature of 150° C. under pressure of 28 mm. Hg.

Analysis:
| | |
|---|---|
| Number average molecular weight | = 2,500 |
| Melting point | = 164°–168° C. |
| Percent by weight combined phenol | = 16 based on the total weight of the isoprene polymer |
| Percent internal unsaturation | = 4 |

PREPARATION OF POLYMER E—PHENOLATED POLYISOPRENE

Into a 2-liter flask equipped with a stirrer and reflux condenser, there was charged 320 grams of thiophenol and 30 grams of polyisoprene. To this mixture there was then added 7.8 grams of p-toluene sulfonic acid and the reaction then conducted in a manner as described for Polymer B.

Analysis:
| | |
|---|---|
| Number average molecular weight | = 3,400 |
| Melting point | = 82°–84° C. |
| Percent by weight combined thiophenol | = 15 based on the total weight of the isoprene polymer |
| Percent internal unsaturation | = 15 |

The polyisoprene used in this example was a liquid product having a number average molecular weight of 3,000 and having 15 percent internal unsaturation.

PREPARATION OF POLYMER R—PHENOLATED POLYISOPRENE

Into a 2-liter flask, equipped with a stirrer and reflux condenser, there was charged 1,500 grams of o-t-butylphenol and 136 grams of polyisoprene (Polymer A). To this mixture there was then added 16.4 grams of boron-trifluoridephenol complex containing 23 percent by weight boron-trifluoride and the reaction then carried out in a manner as described for Polymer B.

Analysis:
| | |
|---|---|
| Number average molecular weight | = 2,400 |
| Melting point | = 138°–141° C. |
| Percent by weight combined o-t-butylphenol | = 21 based on the total weight of the isoprene polymer |
| Percent internal unsaturation | = 5 |

PREPARATION OF POLYMER G—P-DODECYL-PHENOL-FORMALDEHYDE NOVOLAC RESIN

Into a 2-liter reaction flask there was added 262 grams of p-dodecylphenol and 0.2 gram of sulfuric acid (97 percent) added thereto. This mixture was heated to a temperature of 90° C. and then cooled to a temperature of 50° C. 75 grams of formaldehyde were then added, as a 40 percent aqueous solution and the temperature of the reaction mixture was raised to 100° C. This temperature was maintained for a period of about 1.5 hours during which time the reaction mixture was continuously stirred. The reaction flask was then evacuated to a pressure of 50 millimeters of mercury and the water present in the reaction mixture was distilled off until a reaction temperature of 130° C. had been attained. This temperature was maintained until the reaction mixture had attained a Ring and Ball melting point of 190° F. The dodecylphenol-formaldehyde resin was then discharged from the flask.

A masterbatch composition, the formulation of which is noted below, was compounded to a blend in a Banbury mixer.

| Masterbatch Composition I | Parts by Weight |
|---|---|
| Terpolymer of ethylene-propylene hexadiene-1,4 containing 50 percent by weight combined ethylene, 48 percent by weight combined propylene with the remainder being hexadiene-1,4 | 100 |
| Zinc oxide | 5 |
| Stearic acid | 1 |
| Carbon black | 80 |
| Naphthenic oil | 40 |
| Sulfur | 1.5 |
| Tetramethyl-thiuram monosulfide | 1.5 |
| 2-Mercaptobenzothiazole | 0.75 |

To samples of the masterbatch composition, were added various amounts of phenolated isoprene polymers and phenol-formaldehyde resins. Each polymer was dispersed in the sample of the masterbatch by a milling operation on a two-roll mill which had been preheated to a temperature of 100°–120° C. Each composition was sheeted on the two-roll mill and cut into strips, 1 inch by 6 inches by ⅛ inch. These strips were then treated as described in table I and used in the Tack Test previously described. The results of these tests are shown in table I.

TABLE I

| Polymer | Parts by wt. tackifier [1] | Corona discharged, seconds [2] |
|---|---|---|
| (1) Polymer B | 10 | 30 |
| (2) Polymer B | 7 | 30 |
| (3) Polymer B | 5 | 30 |
| (4) Polymer G | 10 | |

[1] Based on 100 parts by wt. ethylene-propylene polymer.
[2] Total time of treatment required for strips to become non-separable.

The source of the corona discharge was a Lepel generator (Phase I, Model SST 1.5 input voltage 117 volts—20 amps. at 60 cycles). The Lepel generator was operated at an output of 15,000 volts, 1/10 ampere and 1,500 watts.

The experiments of table I were carried out at a temperature of about 30° C. by providing air circulation around the specimens as they were being treated.

In each case, the specimens were about 1/16 of an inch from the source of electric discharge.

Also, the electrodes of the corona experiments were bar electrodes buffered with glass.

Similar results are achieved using Polymers C-F in lieu of Polymers B and G and in using screen electrodes in lieu of the bar electrodes.

Additional tackifiers were prepared, added to rubbers and the resultant compositions tested for tack, in a manner as previously described.

PREPARATION OF POLYMER H

Into a reaction flask equipped with an agitator, thermometer and dropping funnel and which contained 40 cc. of toluene and 6 grams of aluminum trichloride, there was added 200 cc. of the by-products from a blending Naphtha stream, containing primarily isoprene and piperylene with small amounts of butadiene and dicyclopentadiene, over a 10–30 minute period, while the contents of the flask were maintained at a temperature of 45°–60° C. After the addition was completed, the reaction mixture was maintained at a temperature of 45°–60 C. for an additional 30 minutes. Toluene, in an amount of 60 cc., was then added to the reaction mixture and the resultant mixture heated at temperature of 70° C. for 2 hours. At the end of the 2-hour period, the reaction mixture was cooled to a temperature of 60° C. and 30 cc. of a 20 percent aqueous solution of sulfuric acid thereto. The resultant solution was then stirred for 15 minutes and washed with 30 cc. of a 20 percent aqueous solution of sodium hydroxide. The washed solution was flashed distilled to a pot temperature of 250° C. and steam distilled to a solid resin.

Analysis:
| | |
|---|---|
| Number average molecular weight | = 1,500 |

PREPARATION OF POLYMER I—POLYISOPRENE-1,4

Into a reaction flask equipped with an agitator, thermometer and dropping funnel and which contained 52 cc. of a 22.2 percent hexane solution of butyl lithium, which had been preheated to a temperature of 50° C., there was added 180 cc. of isoprene while the contents of the flask were maintained at a temperature of 60° C. The reaction mixture was maintained at a temperature of 60° C. for 3 hours and the polyisoprene which was produced was coagulated from the reaction mass using methanol. The polyisoprene was washed with additional methanol and dried to constant weight in a vacuum oven which was at a temperature of 50° C.

Analysis:
    Number average molecular weight    = 3,500

PREPARATION OF POLYMER J—CYCLIZED POLYISOPRENE

Into a reaction flask equipped with an agitator and thermometer, there was charged 30 grams of polyisoprene (Polymer I), 150 grams of hexane and 7.5 grams of p-toluene sulfonic acid. The mixture was heated to reflux, a temperature of about 68°–69° C., and maintained at this temperature for 5 hours. The cyclized polymer was coagulated from the reaction mass using methanol and washed five additional times with methanol and dried.

Analysis:
    Number average molecular weight    = 4,000

PREPARATION OF POLYMER K—COPOLYMER OF ISOPRENE-BUTADIENE— 1,4

Into a 2-liter flask, equipped with an agitator and condenser, there was charged 1,000 ml. of tetrahydrofuran which had been dried by being passed through a column of molecular sieves. To this solvent there was then added 0.130 mole of n-butyl lithium in 80 ml. of heptane and immediately thereafter a blend of 61 to 61 grams of isoprene-butadiene-1,4 was added to the contents of the flask over a 2 hour period. Prior to being charged into the flask, the blend of isoprene-butadiene-1,4 had been passed through a column of $Al_2O_3$. During the addition of the blend, the temperature of the contents of the flask was maintained at 0° C. and the system was continuously purged with nitrogen gas. After the addition of the blend, the temperature of the reaction mixture was raised to 60° C. and kept at 60° C. for a period of 2 hours. Methanol was then added to the flask and the copolymer of isoprene-butadiene-1,4 recovered as the methanol insoluble portion of the reacted mixture. The copolymer was stabilized with 0.05 gram of 2.6-di-t-butyl-4-methylphenol and then dried in a vacuum oven.

Analysis:
    Number average molecular weight    = 3,500

PREPARATION OF POLYMER L—COPOLYMER OF ISOPRENE—STYRENE

This copolymer was prepared in a manner as described for polymer K using, in lieu of butadiene-1,4, 1/10 the equivalent amount of styrene.

PREPARATION OF POLYMER M—POLY(PIPERYLENE)

This polymer was prepared in a manner as described for polymer I using, in lieu of isoprene, the same equivalent amount of piperylene.

PREPARATION OF POLYMER N—POLY(BUTADIENE-1,2)

This polymer was prepared in the same manner as described for polymer I using, in lieu of isoprene, the same equivalent amount of butadiene-1,2.

Analysis:
    Number average molecular weight    = 4,000

A second masterbatch composition, the formulation of which is noted below, was compounded to a blend in a Banbury mixer.

|  | A | B | C |
|---|---|---|---|
| Ethylene-Propylene Rubber (Same as in Masterbatch I) | 100.00 |  | 40.00 |
| Butyl Rubber |  | 100.00 |  |
| Styrene-Butadiene-1,3 Rubber |  |  | 60.00 |
| Zinc Oxide | 5.00 | 5.00 | 5.00 |
| Stearic Acid | 1.00 | 1.00 | 1.00 |
| Carbon Black | 80.00 | 50.00 | 80.00 |
| Naphthenic Oil | 40.00 |  | 40.00 |
| Sulfur | 1.5 |  | 1.5 |
| Tetramethyl-Thiuram Monosulfide | 1.5 |  | 1.5 |
| 2-Mercaptobenzothiazole | 0.75 |  | 0.75 |
| Chlorosulfonated Polyethylene |  | 5.0 |  |

Various tackifiers (seven parts/100 parts by weight rubber) were blended with the above compositions using a two-roll mill.

To samples of this masterbatch composition were added tackifiers in amounts providing seven parts tackifier per 100 parts rubber and the resultant compositions treated with corona discharge as described for the compositions of table I, with the exception that the time of treatment was about 5 seconds.

The tackifiers used and the results of "Tack" are noted in table II.

TABLE II

| Tackifier | Compositions to Which Tackifier Was Added And Results Of Tack Test After Corona Treatment For About 5 Seconds | | |
|---|---|---|---|
|  | A | B | C |
| Polymer H |  | nonseparable | nonseparable |
| Polymer L | nonseparable |  |  |
| Polymer M | nonseparable |  |  |
| Polymer N |  |  | nonseparable |

What is claimed is:

1. A method of improving the tack of rubber in a relatively short period of time which comprises adding a tackifier thereto and subjecting the resultant composition to a corona discharge output voltage = about 5,000 to about 30,000 Space between electrodes = about 1/16 to about and article being treated ¼ of an inch.

2. A method as defined in claim 1 wherein the tackifier is an alkylated phenol-formaldehyde resin.

3. A method as defined in claim 1 wherein the tackifier is p-dodecylphenol-formaldehyde resin.

4. A method as defined in claim 1 wherein the tackifier is a phenolated polymer of isoprene.

5. A method as defined in claim 1 wherein the tackifier is polyisoprene phenolated with p-dodecylphenol.

6. A method of improving the tack of ethylene-propylene polymers as defined in claim 1 wherein a polymeric phenolic tackifier is present in an amount of at least about 1 percent by weight.

7. A method as defined in claim 1 wherein the said composition is subjected to about 250 volt ampere seconds per square inch.

8. A method as defined in claim 1 wherein the electrodes are screen electrodes.

* * * * *

PO-1050
(5/69)

UNITED STATES PATENT OFFICE
CERTIFICATE OF CORRECTION

Patent No. 3,629,084        Dated December 21, 1971

Inventor(s) Anthony C. Soldatos

It is certified that error appears in the above-identified patent and that said Letters Patent are hereby corrected as shown below:

Column 1, line 29, "resent" should read --present--

Column 2, line 44, "ethylidenebicycloheptane" should read --ethylidenebicycloheptene--

Column 4, line 6, after "m" insert --is an integer having--

Column 5, line 32, insert as a new paragraph --Screen electrodes and buffered electrodes are the subject of Application Serial No. 130,243, filed in the name of L. A. Rosenthal on April 1, 1971--

Column 5, line 58, "or" should read --of--

Column 6, line 32, "P-toluene" should read --p-toluene--

Column 7, line 29, "Polymer R" should read --Polymer F--

Column 8, line 15, line 17 and line 35, "table I" should read --Table I--;

line 61, "45°-60C" should read --45°-60°C--

Column 9, line 50, "2.6" should read --2,6--;

line 65 and line 71, "polymer I" should read --Polymer I--

Column 10, line 29, "table I" should read --Table I--;

line 33, "table II" should read --Table II--

Column 10, in Table II, the heading should read --Compositions to Which Tackifier Was Added And Results Of Tack Test After Corona Treatment for About 5 Seconds Column 10, line 53, after "discharge" insert -- under the conditions: --.

Signed and sealed this 4th day of July 1972.

(SEAL)
Attest:

EDWARD M. FLETCHER, JR.
Attesting Officer

ROBERT GOTTSCHALK
Commissioner of Patents